Figure 1:
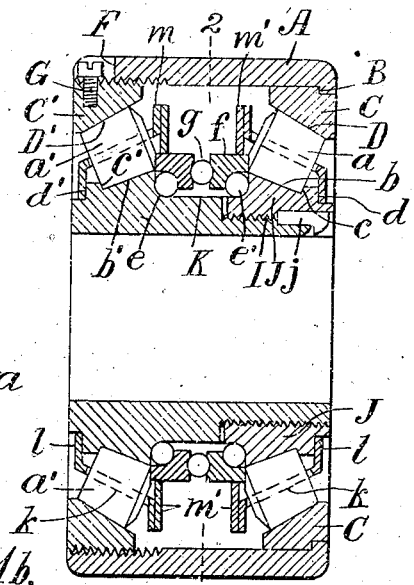

C. S. LOCKWOOD.
COMBINATION ROLLER BEARING.
APPLICATION FILED OCT. 18, 1909.

958,963.

Patented May 24, 1910.

Witnesses:
L. Lee,
J. Walter Greenbaum.

Inventor.
Charles S. Lockwood,
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

COMBINATION ROLLER-BEARING.

958,963.  Specification of Letters Patent.  Patented May 24, 1910.

Application filed October 18, 1909. Serial No. 523,286.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Combination Roller-Bearings, fully described and represented in the following specification and the accompanying drawings, forming a part of the same.

This invention relates to a self-contained roller-bearing in which two series of conical rolls are fitted to inclined conical seats upon opposite ends of the same hub, and embraced by tapering seats within opposite ends of a casing. In such constructions, the end-thrust of the hub within the casing operates to contract the space between one seat on the hub and the opposed tapering seat in the casing, so that the rolls in their rotation in such space tend to crowd toward the center part of the casing; and the object of the invention is to provide a means of resisting such end movement of the rolls with a minimum of friction, and of sustaining such thrust from either series of rolls independently of the opposite series. This is accomplished in the present construction by inserting a thrust-ring or rings to turn movably between the adjacent ends of the rolls, which are beveled to fit the flat ends of such ring, and inserting one or more series of balls between such thrust-ring and a ball-race or races upon the hub to resist end movement of the ring. The hub is preferably formed with a channel between the bases of the opposed conical seats with a ball-race in such channel contiguous to each base and two series of balls therein, and making the thrust-ring in two annular parts with a third series of balls between them so that each may turn independently of the other, if required. The intermediate series of balls is provided only to compensate for slight variations of velocity in the movement of the rolls, and the separate rings which touch their bases. One of the conical seats upon the hub is preferably made adjustable toward the other so as to adjust the ball-races in the channel toward one another to fit the rings snugly upon the intermediate series of balls, and one of the tapering seats in the casing is preferably made adjustable toward the opposite tapering seat to fit such seat snugly to the outer sides of the rolls. Means is also provided for locking the seats upon the hub and in the casing when suitably adjusted, and for guiding the rolls upon their seats.

Figure 2:
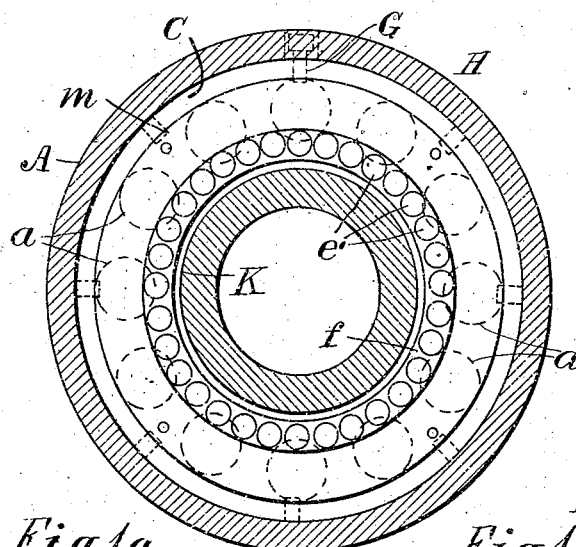
Figure 1A:
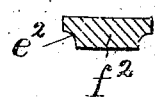
Figure 3:
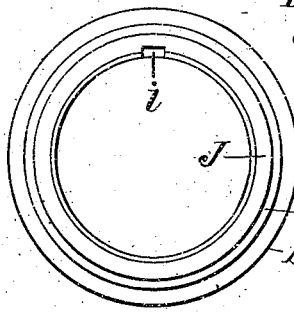
Figures 1B, 5:
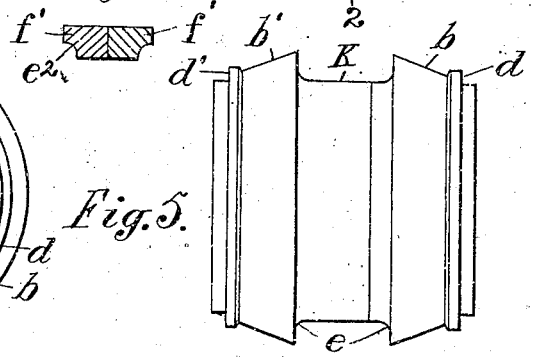
Figure 4:
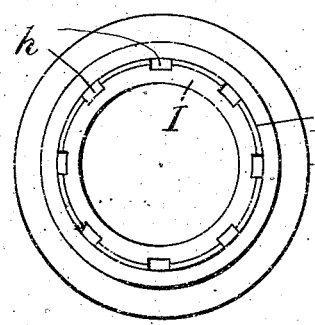
Figure 6:
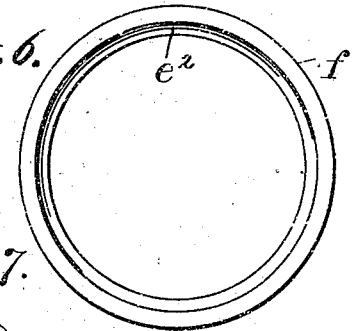
Figure 7:

The annexed drawing shows an embodiment of the invention, Figure 1 being a longitudinal section of a bearing, where hatched, Fig. 1ᵇ is a cross section of two thrust-rings in contact; and Fig. 1ᵃ is a cross section of a single thrust-ring with ball-races upon its opposite edges. Fig. 2 is a section on line 2—2 in Fig. 1; Fig. 3 shows the end of the collar which is adjustable with one of the conical seats upon the end of the hub; Fig. 4 shows the end of the hub upon which such ring is fitted; Fig. 5 is an elevation of the hub; Fig. 6 shows the inner side of one of the thrust-rings which engages the contiguous ends of the rolls; and Fig. 7 is a perspective view of the key for locking the collar upon the hub.

The casing A is shown as a cylindrical shell with a shoulder B inside of one end to which a ring-section C is fitted, and provided with a tapering seat D to support the rolls $a$. The casing is threaded internally at the opposite end and provided with a threaded ring-section C′ having a tapering seat D′ to embrace the opposite series of rolls $a'$. A notch F is shown at one end of the casing and a screw G which is tapped into the periphery of the ring-section C′ and its head fitted to such notch to hold the ring from turning when adjusted. The adjustment is permitted by a series of tap-holes in the ring-section as shown at H in Fig. 2. This construction secures the smallest amount of waste in the manufacture, as the casing can be made of a piece of tubing, and the rings C and C′ of plain steel collars.

The hub shown in Figs. 1 and 5 has an integral conical seat $b'$ formed thereon near one end with a solid integral collar at the outer or smaller end of such seat, which forms an inner shoulder $c'$ next the smaller ends of the rolls and an outer shoulder $d'$ which is employed to guide the cage for the rolls. The hub is formed near the end opposite the seat $b'$ with a threaded boss I, and a collar J screwed thereon and formed with tapering conical seat $b$, which has inner and outer shoulders $c$ and $d$ near its outer end, like the seats $b'$.

The bases of the conical seats project above the central portion of the hub leaving a channel K, the opposite ends of which are rounded to form ball-seats e to which two series of balls e' are fitted.

Thrust-rings f are formed each upon its inner side with a ball-race $e^2$ shown in Fig. 6, to fit the balls e', and the adjacent ends of the rings are formed with opposed ball-races to fit an intermediate series of balls g. The ends of the rolls a, a', are beveled to fit the outer ends of the thrust-rings f.

The threaded connection of the seat b with the hub permits the adjustment of the ball-races e toward one another, which crowds the rings f slightly together to snugly embrace the intermediate balls g. This holds the thrust-rings to rotate in a fixed path, and enables the rolls a, a', to be perfectly supported by such thrust-rings in opposition to any tendency to end movement.

To secure the seat b upon the hub when adjusted, either the boss I or the ring J is provided with a series of keyways h as shown in Fig. 4, and the connecting part with a single keyway i, which permits a key j to be inserted when the keyway i is in coincidence with either of the keyways h, thus locking the seat b securely upon the hub. The screw g serves in like manner to lock the adjustable seat in the casing to its working position.

The means shown for guiding the rolls upon their seats is of the usual character, excepting that the two series of rolls are provided with independent cages and each has an inner collar fitted to turn freely upon the outer side of one of the thrust-rings. Each cage is shown with an outer collar l fitted to one of the shoulders d or d' upon the hub, an inner collar m of considerably larger diameter, and inclined bars k which connect the two collars on a line with the axes of the rolls and thus touch their opposite sides on the line of their centers.

To support the inner collar m, it is provided with a supplemental collar m' of smaller bore fitted movably to the exterior of the adjacent thrust-ring f, the cage being thus supported at both ends and held in a concentric path about the axis of the bearing.

Fig. 1$^b$ shows a modification of the construction in which the thrust-rings f' have their adjacent faces in contact with one another without any intermediate balls as in Fig. 1, but if the parts in one end of the bearing are constructed precisely like the parts in the opposite end, it is obvious that the two thrust-rings would revolve at the same speed and would need no means (like balls) interposed between them to compensate for variations of speed, and may, therefore, be united in a single ring $f^2$ with ball-races $e^2$ upon its opposite ends as shown in Fig. 1$^a$. I have, therefore, claimed the thrust-ring fitted between the series of rolls and held movably upon the hub by balls fitted to a suitable race.

The adjustment of the collar J upon the hub, with one of the conical seats b, is for the obvious purpose of bringing the ball-races e into such a relation to the thrust-rings as to hold the thrust-rings from end play, while such rings adequately support the thrust of the rolls a and a', and such an adjustment of the parts performs the same function as the thrust-rings f touching, as in Fig. 1$^b$, or as the single piece $f^2$ with ball-races upon its opposite edges, as in Fig. 1$^a$.

Having thus set forth the nature of the invention what is claimed herein is:

1. In a self-contained roller bearing, the combination, with a hub having oppositely inclined conical seats with a channel between their bases and a ball-race in the channel adjacent to each base with a series of balls therein, of two series of conical rolls fitted to the conical seats on the hub, a casing having tapering seats to embrace the outsides of the two series of rolls, and thrust-rings fitted movably to the inner ends of the rolls and provided with ball-races to embrace the two series of balls, and means for supporting the adjacent ends of the rings upon one another to resist end-thrust.

2. In a self-contained roller bearing, the combination, with a hub having oppositely inclined conical seats with a channel between their bases and a ball-race in the channel adjacent to each base with a series of balls therein, of two series of conical rolls fitted to the hub and beveled upon their adjacent ends, a casing having tapering seats to embrace the outsides of the two series of rolls, and thrust-rings having each a ball-race fitted to the said balls, and having a flat end fitted to the beveled ends of the rolls, the adjacent ends of the rings having ball-races with a series of balls fitted thereto between the rings to resist end-thrust.

3. In a self-contained roller bearing, the combination, with a hub having oppositely inclined conical seats with a channel between their bases and a ball-race in the channel adjacent to each base with a series of balls therein, of two series of conical rolls fitted to the hub and beveled upon their adjacent ends, a casing having tapering seats to embrace the outsides of the two series of rolls, and thrust-rings having each a ball-race fitted to the said balls, and having a flat end fitted to the beveled ends of the rolls, the adjacent ends of the rings having ball-races with a series of balls fitted thereto the hub having means for adjusting the ball-races in the channel toward one another, for snugly embracing the balls between the two rings.

4. In a self-contained roller bearing, the combination, with a hub having a conical seat upon one end and a threaded boss upon the opposite end, of a threaded collar fitted to such boss and provided with an oppositely inclined conical seat, the boss and collar having a series of keyways and a key fitted to the same for locking the parts when adjusted, the bases of the conical seats having opposed ball-races thereon with series of balls fitted thereto, two series of conical rolls fitted to the conical seats on the hub with their adjacent ends beveled, a casing having tapering seats to embrace the outsides of the two series of rolls, thrust-rings fitted movably to the inner ends of the rolls and provided with ball-races to embrace the two series of balls, and having ball-races upon their adjacent ends with a series of balls fitted thereto, the collar on the hub being adjustable to embrace the three series of balls snugly.

5. In a self-contained roller bearing, the combination, with a hub having oppositely inclined conical seats with a channel between their bases and a ball-race in the channel adjacent to each base with a series of balls therein, of two series of conical rolls fitted to the conical seats on the hub, thrust-rings fitted movably to the inner ends of the rolls and provided with ball-races to embrace the two series of balls, means for supporting the adjacent ends of the rings upon one another, a casing having a cylindrical shell with ring-sections secured in its opposite ends and provided each with a tapering seat to embrace the outer sides of the rolls, and one of such ring-sections being adjustable toward the other to vary their bearing upon the rolls, substantially as herein set forth.

6. In a self-contained roller bearing, the combination, with a hub having oppositely inclined seats with a channel between their bases and a ball-race in the channel adjacent to each base, of means for adjusting the said bases and ball-races toward one another and for locking them in position when adjusted, two series of conical rolls fitted to the conical seats on the hub and beveled upon their adjacent ends, thrust-rings fitted movably to the beveled ends of the rolls and provided with ball-races to embrace the two series of balls, and with ball-races upon their adjacent ends with a series of balls fitted thereto, and a cylindrical casing having ring-sections fitted in its opposite ends and formed with tapering seats to embrace the two series of rolls, one of the ring-sections being provided with means for adjusting it toward the other, and with means for locking it in position when adjusted.

7. In a roller-bearing, the combination, with a hub having opposite conical seats thereon with opposed shoulders at their outer ends and a channel between the bases of such seats with ball-races at the bases of the seats, of two series of rolls fitted upon the seats in contact with the inner shoulders on the hub, a casing having tapering seats to embrace the rolls, balls fitted to the ball-races in the channel with thrust-rings having ball-races fitted to the balls and contacting with the ends of the rolls, each series of rolls having a cage with bars $k$ fitted between the rolls, an outer collar $l$ fitted to one of the shoulders upon the hub, and an inner collar $m$ fitted movably to the periphery of the adjacent thrust-ring, whereby the cage is held concentric at both ends.

In testimony whereof I have hereunto set my hand in the presence of two subscribing witnesses.

CHARLES S. LOCKWOOD.

Witnesses:
L. LEE,
THOMAS S. CRANE.